July 8, 1947.  H. R. MEAHL  2,423,461
ATTENUATOR FOR ULTRA HIGH FREQUENCIES
Filed May 18, 1945
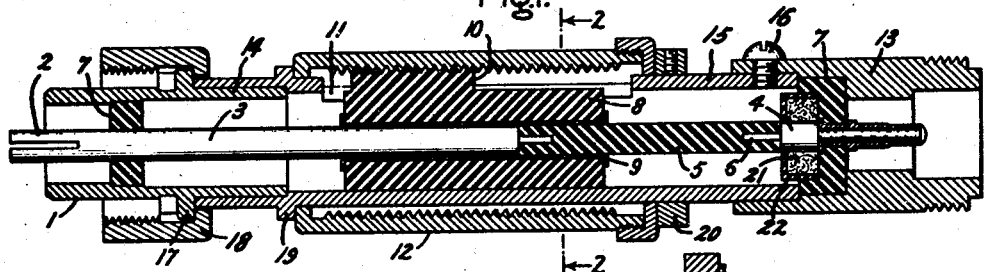
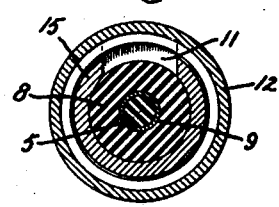
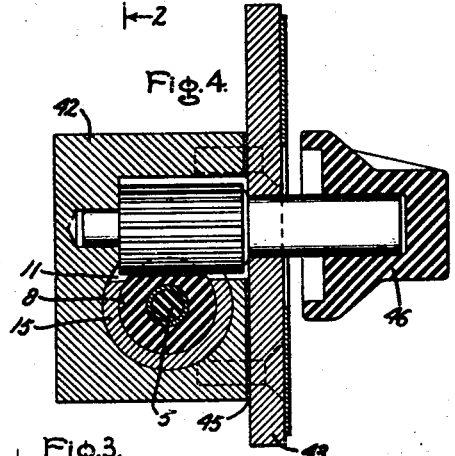
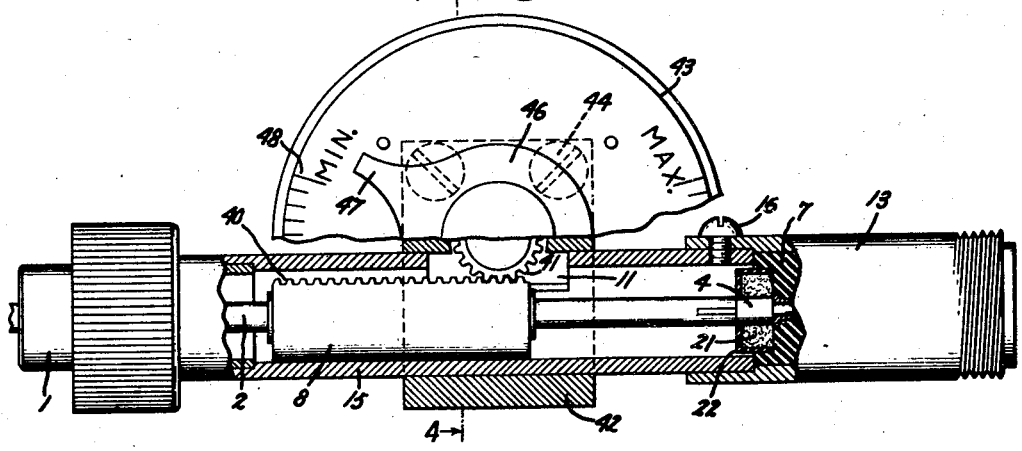
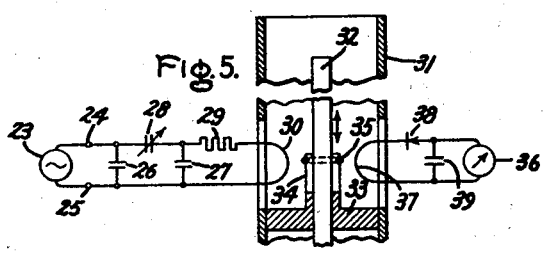
Inventor:
Harry R. Meahl,
by *Harry E. Dunkery*
His Attorney.

Patented July 8, 1947

2,423,461

UNITED STATES PATENT OFFICE 2,423,461

ATTENUATOR FOR ULTRA HIGH FREQUENCIES

Harry R. Meahl, Schenectady, N. Y., assignor to General Electric Company, a corporation of New York Application May 18, 1945, Serial No. 594,485

4 Claims. (Cl. 178—44)

1

My invention relates to ultra high frequency wavemeters and more particularly to an attenuator for utilization therein.

In wavemeters for measuring the frequency of ultra high frequency waves, the problem frequently arises of connecting the meter to an input circuit in which the intensity of a wave whose frequency is to be measured may vary over a considerable range. In high frequency systems employing such apparatus, it is desirable to have impedance matching throughout. In the copending application of Stephen C. Clark, Jr., Serial No. 531,224, filed April 15, 1944, and assigned to the assignee of the present invention, there is disclosed an attenuator for an ultra high frequency system which employs a concentric transmission line in which a variable capacitance is serially connected between adjacent sections of the conductors of the line. The variable capacitance is of such size that, in comparison with the input and output shunt capacitance of the adjacent sections of the concentric transmission line, the effect of its variation on the input and output impedances is minimized.

It is an object of the present invention to provide a new and improved attenuator of the type disclosed in the above-mentioned copending application in which changes of the reactance in the input circuit are prevented from being reflected into the wave measuring elements of the system.

It is another object of my invention to provide a new and improved attenuator for systems of this nature wherein the impedance of an input wave may vary over any value in magnitude and phase and the changes in impedance in the input are prevented from being reflected into the output circuits.

For a better understanding of my invention, reference may be had to the following description taken in connection with the accompanying drawing and its scope will be pointed out in the appended claims. Fig. 1 is a longitudinal cross-sectional view of one embodiment of my invention including the attenuator connected in a concentric transmission line, and Fig. 2 is a vertical cross-sectional view along the lines 2—2 of Fig. 1. Fig. 3 represents a modification of the attenuator of my invention as embodied in a concentric transmission line and which employs means for more accurately controlling and determining the amount of attenuation, Fig. 4 is a vertical cross-sectional view of the attenuator of Fig. 3 taken along the lines 4—4, and Fig. 5 is a circuit schematically illustrating the operation of the attenuator of Figs. 1-4.

Referring to Figs. 1 and 2 jointly, there is shown an attenuator which comprises a section of concentric transmission line having a tubular outer conductor 1 and a centrally disposed inner conductor 2 along which an ultra high frequency electromagnetic wave is propagated. The centrally disposed inner conductor comprises two similar metallic sections 3, 4, which are separated by a spacer 5 of any suitable insulating material, such as, for example, polystyrene. The sections 3 and 4 at their adjacent ends are provided with portions of reduced diameter 6, which fit in cooperating holes in the ends of spacer 5. The spacer 5 and the sections 3, 4 are all of the same diameter so that physically the inner conductor 2 appears as a continuous cylindrical member which is supported within the outer conductor 1 by means of a plurality of insulators 7.

Supported on the inner conductor 2 is a dielectric cylinder 8 of any suitable insulating material, such as, for example, polystyrene. The dielectric member 8 has a central bore into which is fitted a conductive member in the form of a metallic sleeve 9, the sleeve being spun over at the ends of the dielectric cylinder to form a rigid construction. The sleeve 9 has an inner diameter which is substantially equal to the outer diameter of the section 3 and is in contact with this section of the inner conductor and transmission line. The metallic sleeve 9, moreover, extends over a portion of the insulating spacer 5. The dielectric cylinder 8 is provided at its left-hand end with a protruding portion 10 which extends through a slot or an opening 11 in the outer conductor 1. The protruding portion 10 moreover is provided with threads which engage threads within a metallic sleeve 12 which surrounds the outer conductor 1 adjacent the slot 11.

In construction, the outer conductor may be formed in a plurality of parts, such as a pair of end sections 13, 14 and an intermediate section 15, the intermediate section containing the slot 11. The section 13 may be joined to the section 15 by means of a plurality of screws 16, while the section 14 may contain a shoulder 17 against which is abutted an internally threaded nut 18 and which may be used for connecting the left-hand portion of the transmission line to an input circuit. The intermediate section 15 has a shoulder portion 19 adjacent the slot 11 and the threaded sleeve 12 abuts against this shoulder. A collar 20 abutting against the opposite end of sleeve 12 prevents longitudinal motion of the sleeve on the intermediate section 15, while permitting rotation of the sleeve about this portion of the outer conductor.

Means are provided for preventing changes in reactance of the circuits connected across the input conductors 1, 2 of the attenuator from being reflected into output circuits connected to the conductors 4, 13 and comprise a dissipative element 21 which may be, for example, a mass of metallic fibers such as steel wool which surround the input end of the conductor 4. The fibers 21 are retained in position by means of a cup-shaped retainer 22 formed of a suitable dielectric material for example and which fits into a recess in the insulator 7.

In operation, the left-hand portion of the concentric transmission line may be connected to an input circuit, such as a source of ultra high frequency electromagnetic waves, while the right-hand portion of the attenuator comprising the section 4 of the inner conductor and the section 13 of the outer conductor may be connected to a load circuit such as, for example, a frequency determining meter (not shown). In such ultra high frequency applications, of course, it is customary to have the impedance of the connecting transmission lines match with the impedances of such a source and such a load. This impedance includes the relatively high shunt capacitance incident to the position of the inner conductor within the outer conductor of the transmission line. Since in some applications it is desirable to have the voltage supplied to a load circuit maintained constant while the voltage from an input circuit may vary over a considerable range, attenuation of the ultra high frequency input wave is required. In the construction above described, the opposed ends of conductors 3 and 4 separated by the insulating spacer 5 form a capacitance of small value which is connected in series with the sections 3, 4 of the inner conductor of the transmission line and which attenuates the high frequency wave traveling along that line. The conductive member or sleeve 9 forms means for varying the value of this capacitance. This variation is obtained by rotation of the sleeve 12 to move the dielectric cylinder 8 and the sleeve 9 along the spacer 5, the movement providing a continuous variation of the attenuation of the high frequency wave. This series capacitance, moreover, is relatively small compared to the shunt capacitance which exists between the inner and outer conductors 4, 13 of the transmission line.

The operation of the attenuator may be best explained by reference to the circuit diagram of Fig. 5 in which a source 23 of a wave to be measured is connected across the input terminals 24, 25 of wave measuring apparatus. The terminals 24, 25 may be the terminals of a concentric transmission line of the type shown in Fig. 1. This line, as is well known, has a shunt capacitance indicated by the capacitors 26, 27 and the variable capacitance described above is indicated as the variable capacitance 28 which is serially connected with one of the conductors of the transmission line. The dissipative element 21 of Fig. 1 is represented in the circuit as the resistance 29 connected in series with the same conductor. The transmission line having input terminals 24, 25 terminates in a coupling loop 30 which extends into a cavity resonator comprising a tubular outer conductor 31 and a centrally disposed inner conductor 32. Conductor 32 is variable in position and is short-circuited to outer conductor 31 at one of its ends by being in conductive contact with a conductive end wall 33. Conductor 32 is slidable through an opening in the end wall and is engaged by finger contacts 34 which are held in engagement with conductor 32 by means of a garter spring 35. The cavity resonator defined by the conductors 31, 32 is of the open-ended quarter wave line type and is tuned to resonate at the frequency of the waves of the source 23 by varying the position of the conductor 32 to vary the length of the concentric line resonator. Energy from the resonator is supplied to a meter 36 through an output electrode or coupling loop 37. High frequency currents, supplied to the coupling loop 37 from the resonator 31, 32, are rectified by the crystal rectifier 38. The unidirectional components are supplied to the meter 36 and the alternating components are by-passed to the meter 36 by capacitance 39.

In the circuit of Fig. 5, the series capacitance 28 is effective to give a continuous variation of the attenuation of the high frequency waves supplied to the terminals 24, 25. The resistance 29 constituted by the dissipative element in my attenuator functions to prevent any changes in reactance in the input circuit 23 from being transmitted to the coupling loop 30. Accordingly, in the composite structure, substantially no reactive effect of any load circuit which may be connected to the terminals 24, 25 is transmitted through the resonator 31, 32 to the meter 36. Thus, the input waves may vary in intensity over a range of 100 to 1 and the reactance of the input circuit may vary from highly capacitive to highly inductive without overloading the meter 36. As a result, the output impedance of the attenuator is maintained substantially constant as the attenuation is varied by variation of the capacitance 28 over a substantial range. This range may be, for example, from a few decibels to an almost infinite amount of attenuation.

In the modifications of the invention illustrated in Figs. 3 and 4, a precision attenuator is shown which has no protruding surface, but instead the rack 40 is formed on one surface. The rack 40 is engaged by a pinion 41 which is supported in a bearing structure comprising a housing portion 42 which is attached to the outer conductor section 15 and a face plate 43 which is fastened to the housing member by means of a plurality of screws 44. A gasket 45, interposed between the face plate 43 and the housing member 42, can make the structure water-tight. The pinion 41 may be rotated by a control knob 46 which carries a pointer 47 and cooperates with a scale 48 on the face plate to indicate precisely the amount of attenuation obtained.

From the foregoing, it is seen that my invention provides a variable attenuator for an ultra high frequency wave which is simple in construction and operation. A continuously variable amount of attenuation is provided which has no appreciable effect on either the input or the ouput circuit. At the same time, the input wave may vary over a wide range both in phase and magnitude without producing any appreciable change in the impedance coupled into the cavity resonator and the frequency indicating circuit.

While I have shown a particular embodiment of my invention, it will of course be understood that I do not wish to be limited thereto since various modifications may be made, and I contemplate by the appended claims to cover any such modifications as fall within the true spirit and scope of my invention.

What I claim as new and desire to secure by Letters Patent of the United States is:

1. An attenuator comprising a concentric transmission line and consisting of a tubular outer conductor and a centrally disposed inner conductor, said inner conductor consisting of two sections separated by an insulating spacer, an insulator supported on said inner conductor, said insulator having a conductive sleeve extending along said inner conductor, said sleeve contacting one of said sections and being adjustable in position along said spacer, and dissipative means between said conductors and one end of said insulator.

2. An attenuator for high frequency electromagnetic waves comprising a section of concentric transmission line having a tubular outer conductor and a centrally disposed inner conductor, said inner conductor consisting of a pair of metallic sections connected by a non-conducting section to form a capacitance connecting said metallic sections for attenuating said wave, means to vary the amount of said attenuation comprising a conductive sleeve contacting one of said metallic sections and extending over said non-conducting section a variable distance, and energy dissipating material between the other of said pair of sections and said outer conductor adjacent said non-conducting section.

3. An attenuator comprising a concentric transmission line and consisting of a tubular outer conductor and a centrally disposed inner conductor, said inner conductor consisting of two sections separated by an insulating spacer, a conductive sleeve extending along said inner conductor in contact with one of said sections and being adjustable in position along said spacer, and energy dissipating means between the other of said sections and said outer conductor.

4. An attenuator comprising a concentric transmission line and consisting of a tubular outer conductor and a centrally disposed inner conductor, said inner conductor consisting of two sections separated by an insulating spacer, a conductive sleeve extending along said inner conductor in contact with one of said sections and being adjustable in position along said spacer, and energy dissipating means between the other of said sections and said outer conductor, said means comprising a mass of metallic fibers in conductive contact with said other section.

HARRY R. MEAHL.

REFERENCES CITED

The following references are of record in the file of this patent:

UNITED STATES PATENTS

| Number | Name | Date |
|---|---|---|
| 2,337,219 | Zottu | Dec. 21, 1943 |
| 2,293,839 | Linder | Aug. 25, 1942 |